(12) United States Patent
Spaulding et al.

(10) Patent No.: US 8,831,938 B2
(45) Date of Patent: *Sep. 9, 2014

(54) SPEECH RECOGNITION ADJUSTMENT BASED ON MANUAL INTERACTION

(71) Applicant: General Motors LLC, Detroit, MI (US)

(72) Inventors: Jeremy M. Spaulding, Birmingham, MI (US); Jason W. Clark, Grosse Pointe Woods, MI (US)

(73) Assignee: General Motors LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,680

(22) Filed: Feb. 18, 2013

(65) Prior Publication Data

US 2013/0166305 A1    Jun. 27, 2013

Related U.S. Application Data

(62) Division of application No. 12/059,815, filed on Mar. 31, 2008, now Pat. No. 8,380,499.

(51) Int. Cl.
*G10L 15/00* (2013.01)
*G10L 21/00* (2013.01)

(52) U.S. Cl.
USPC ......................... 704/231; 704/275

(58) Field of Classification Search
USPC ......................... 704/231–257, 275
See application file for complete search history.

(56) References Cited

U.S. PATENT DOCUMENTS

| 5,027,406 | A | * | 6/1991 | Roberts et al. ................ 704/244 |
| 6,012,030 | A | | 1/2000 | French-St. George et al. |
| 6,018,711 | A | * | 1/2000 | French-St. George et al. ............... 704/275 |
| 6,195,634 | B1 | | 2/2001 | Dudemaine et al. |
| 6,882,973 | B1 | | 4/2005 | Pickering |
| 7,881,936 | B2 | | 2/2011 | Longe et al. |
| 8,244,536 | B2 | | 8/2012 | Arun |
| 8,380,499 | B2 | | 2/2013 | Spaulding et al. |
| 2003/0055655 | A1 | | 3/2003 | Suominen |
| 2003/0158732 | A1 | | 8/2003 | Pi et al. |
| 2005/0049859 | A1 | * | 3/2005 | Arun ............................. 704/231 |
| 2006/0282268 | A1 | * | 12/2006 | Huang .......................... 704/275 |
| 2007/0033053 | A1 | * | 2/2007 | Kronenberg et al. ......... 704/275 |
| 2007/0153130 | A1 | | 7/2007 | Preissner et al. |
| 2008/0109220 | A1 | * | 5/2008 | Kiss ............................. 704/235 |
| 2009/0125299 | A1 | | 5/2009 | Wang |
| 2009/0222265 | A1 | * | 9/2009 | Iwamiya et al. .............. 704/246 |

* cited by examiner

*Primary Examiner* — Samuel G Neway
(74) *Attorney, Agent, or Firm* — Anthony L. Simon; Reising Ethington P.C.

(57) ABSTRACT

A method of operating a speech recognition system on a vehicle having a visual display and manually-operated input device that includes initiating a speech recognition system, controlling menu selections on a visual display using a manually-operated input device, receiving a notification from the manually-operated input device indicating that the user is manipulating the device in conjunction with the menu selections on the visual display, and adjusting operation of the speech recognition system based on input received by the manually-operated input device.

7 Claims, 4 Drawing Sheets

SPEECH RECOGNITION ADJUSTMENT BASED ON MANUAL INTERACTION

CROSS-REFERENCE TO RELATED APPLICATIONS

This application is a divisional of U.S. patent application Ser. No. 12/059,815, filed Mar. 31, 2008, now U.S. Pat. No. 8,380,499. The complete disclosure of this prior application is incorporated herein by reference.

TECHNICAL FIELD

The present invention relates generally to speech recognition systems. More specifically, the present invention relates to a method of operating a speech recognition system.

BACKGROUND OF THE INVENTION

Speech recognition systems are well known and have been used in many applications. Generally, speech recognition systems involve converting spoken words to machine code. Speech recognition systems are used in automotive applications and allow a user to give input to a vehicle communications system. That input can then be used to effectuate the user's commands. Often, the speech recognition system will ask a user a question and allow a user a certain amount of time to respond to the question. For example, the user could be provided an extensive menu of available selections. And it can take the user a variable amount of time to read and interpret the menu selections. In the meantime, the speech recognition system waits for a response for a fixed amount of time, but does not compensate when the user needs more time to complete his or her selections.

SUMMARY OF THE INVENTION

According to an aspect of the invention, there is provided a method of operating a speech recognition system that includes providing a list of menu items that can be inputted verbally by a user via a speech recognition system, displaying menu items from the list on a visual display, and starting a listening period during which the speech recognition system listens for verbal input of one of the menu items. The method also includes selecting the timing of the listening period based on data related to the size of the list.

According to another aspect of the invention, there is provided a method of operating a speech recognition system on a vehicle having a visual display and a manually-operated input device. The method includes initiating a speech recognition system, controlling menu selections on a visual display using a manually-operated input device, receiving a notification from the manually-operated input device indicating that the user is manipulating the device in conjunction with the menu selections on the visual display, and adjusting operation of the speech recognition system based on input received by the manually-operated input device.

According to another aspect of the invention, there is provided a method of operating a speech recognition system that includes providing a visual display in a vehicle that shows user menu choices related to vehicle operation, providing a manually-operated input device that allows a user to move through a list of the menu choices shown on the visual display, sending a signal from the manually-operated input device to a vehicle telematics unit each time the user manipulates the device to move through the list, initiating a listening window during which the speech recognition system waits for verbal input of one of the input choices, and changing the timing of the listening window in response to signals sent from the manually-operated input device and received at the telematics device.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method described below integrates the operation of a speech recognition system with a manually-operated input device and a visual display. More specifically, the system can adjust a listening window during which the speech recognition system listens for speech. The adjustment can depend on a variety of factors. Examples of these factors can include the number of menu options the user has to review or the number of times the user manipulates a manually-operated input device. Often, speech recognition systems use a listening window having a fixed start time and a fixed duration. But it is envisioned that this method changes the listening period based on the size of the list shown on the visual display or the input received at the input device. For instance, as the user scrolls through a large list of menu options using the input device, the input device can send signals that indicate the amount and/or frequency with which the user scrolls through the menu choices displayed on the visual display. These signals can be used to adjust the listening window allowing the user to respond to the speech recognition system. Additionally, the speech recognition system can be considered part of a multi-modal system. The multi-modal system incorporates the manually-operated input device, a voice interface, and the visual display. The input device, the voice interface, and the visual display interact allowing the user alternate human-machine interfaces with which to control vehicle systems.

Communications System—

Figure 1:
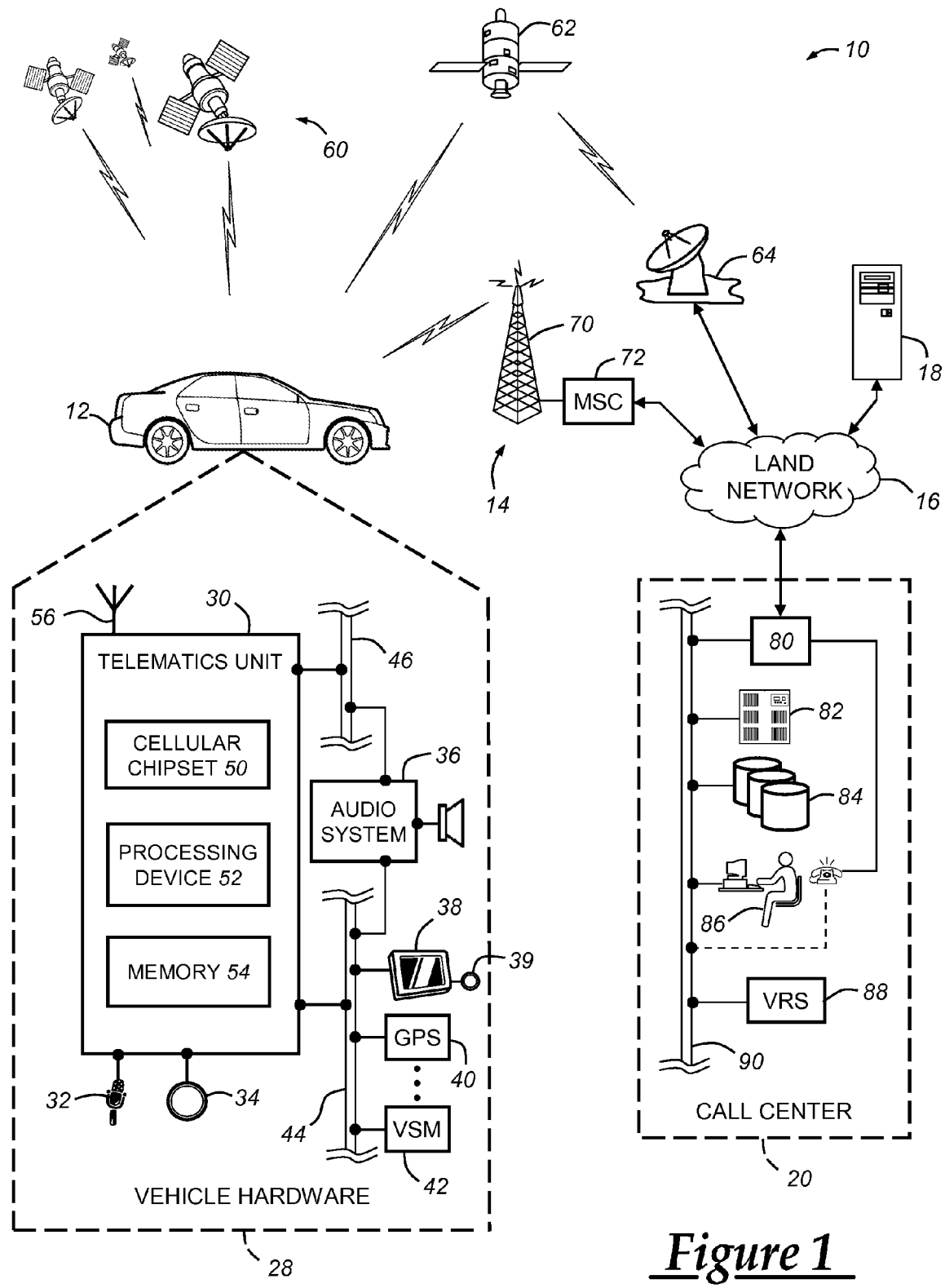
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Yet another example of a VSM is a manually-operated input device. The manually-operated input device can be connected to the telematics device 30, the communications bus 44, or can be wirelessly connected to the vehicle via a short-range wireless protocol. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 preferably enables wireless voice and/ or data communication over wireless carrier system 14 so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, EDGE, and WiMAX.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out the method discussed herein.

Telematics unit 30 can be used to provide a diverse range of vehicle services that involve wireless communication to and/ or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system for other purposes, such as fleet management. Also, new or updated map data can be downloaded to the GPS module 40 from the call center 20 via the telematics unit 30.

Vehicle electronics 28 also includes a number of vehicle user interfaces that provide vehicle occupants or users with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an onboard automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant or user and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. It includes a manually-operated input device, such as a touch screen surface or a rotary knob 39 that enables the user to select and otherwise interact with the displayed contents of visual display 38. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a PSTN such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Call center 20 can also include a telematics PSAP database 92 containing the ESZ and other contact information for each PSAP. This can be a separate database or one integrated into database 84. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be use.

Figure 2:
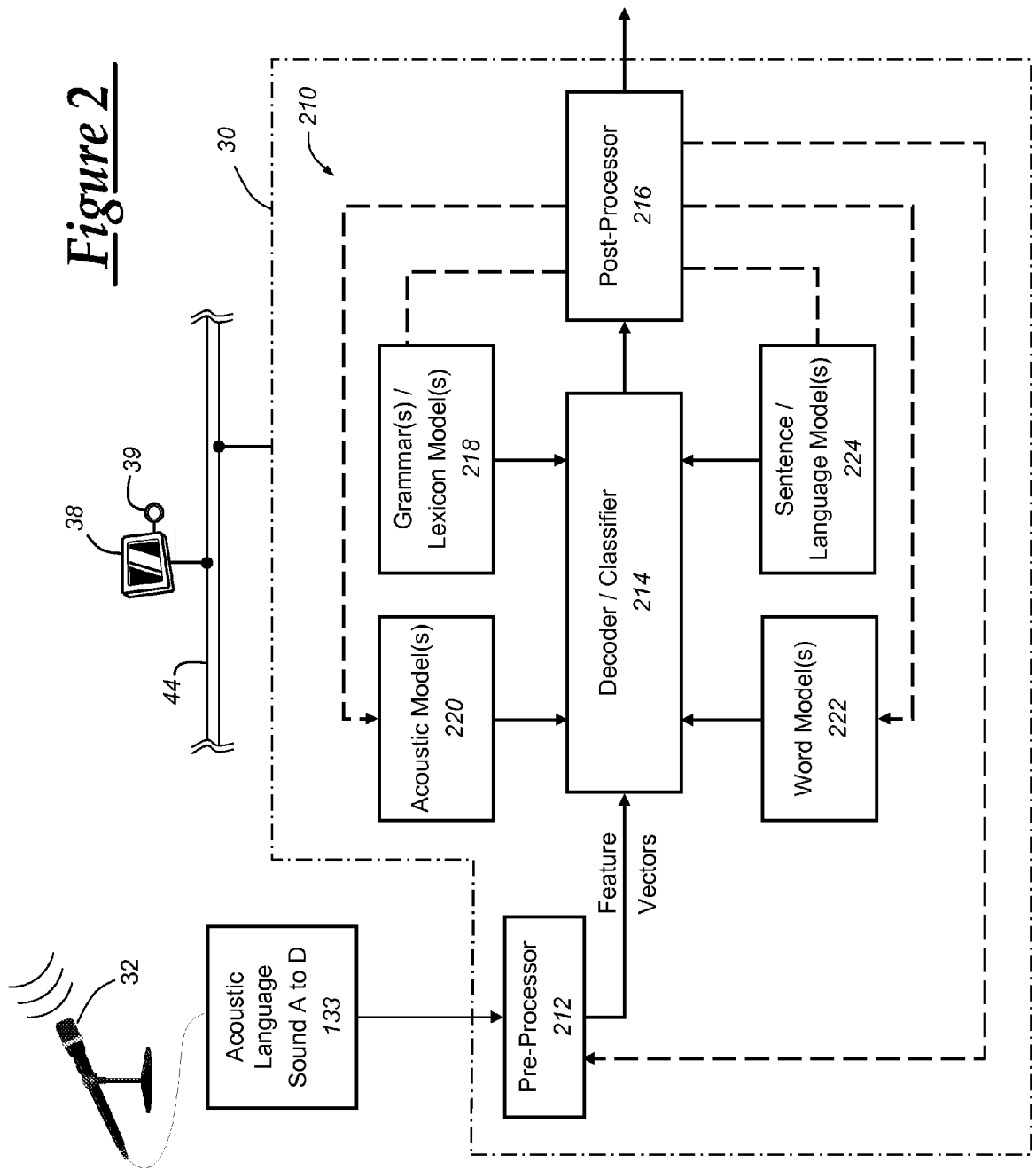
FIG. 2 is a block diagram depicting an exemplary embodiment of automatic speech recognition architecture that can be embedded within the telematics unit of FIG. 1 and used to implement exemplary methods of FIGS. 3 and 4.

Turning to FIG. 2, there is shown an exemplary operating environment comprising automatic speech recognition architecture. The automatic speech recognition architecture can be embedded within the telematics unit 30 of FIG. 1 and used to implement the methods disclosed herein. In general, a user or vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates a specific exemplary architecture for an ASR system 210 that can be used to enable the presently disclosed method. As shown in FIG. 2, ASR system 210 can be implemented within telematics unit 30, although it will be appreciated that ASR system 210 can be a separate system implemented on a vehicle not having a telematics unit 30. The system 210 includes a device to receive speech, such as the microphone 32 with an acoustic interface 133 such as a sound card to digitize the speech into acoustic data. The system 210 also includes a memory such as the memory 54 in the telematics unit 30 for storing the acoustic data and storing speech recognition software and databases, and a processor such as the processing device 52 to process the acoustic data. The processing device 52 functions with the memory 54 and in conjunction with the following modules: a front-end processor or pre-processor software module 212 for parsing streams of the acoustic data of the speech into parametric representations such as acoustic features; a decoder software module 214 for decoding the acoustic features to yield digital subword or word output data corresponding to the input speech utterances; and a post-processor software module 216 for using the output data from the decoder module 214 for any suitable purpose.

One or more modules or models can be used as input to the decoder module 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative exemplary embodiment, some or all of the ASR system 210 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the telematics unit 30 for in-vehicle speech processing. Similarly, speech recognition software can be processed using processors of one of the servers 82 in the call center 20. In other words, the ASR system 210 can be resident in the telematics unit 30 or distributed across the call center 20 and the vehicle 12 in any desired manner.

First, acoustic data is extracted from human speech wherein a vehicle occupant speaks into the microphone 32, which converts the utterances into electrical signals and communicates such signals to the acoustic interface 133. A sound-responsive element in the microphone 32 captures the occupant's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 133 converts the analog electrical signals into digital electronic signals. The digital data are binary bits which are buffered in the memory 54 and then processed by the processing device 52 or can be processed as they are initially received by the processing device 52 in real-time.

Second, the pre-processor module 212 transforms the continuous stream of digital speech data into discrete sequences of acoustic parameters. More specifically, the processing device 52 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processing device 52 executes the decoder module 214 to process the incoming feature vectors of each test pattern. The decoder module 214 is also known as a recognition engine or classifier, and uses stored known reference patterns of speech. Like the test patterns, the reference patterns are defined as a concatenation of related acoustic frames and corresponding parameters. The decoder module 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMMs for a sequence of subwords can be concatenated to establish word HMMs.

The speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of a word or subword and can be based on particular speakers, speaking styles, and audible environmental conditions. Those skilled in the art will recognize that reference patterns can be generated by suitable reference pattern training of the ASR system 210 and stored in memory. Those skilled in the art will also recognize that stored reference patterns can be manipulated, wherein parameter values of the reference patterns are adapted based on differences in speech input signals between reference pattern training and actual use of the ASR system 210. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module 216 receives the output data from the decoder module 214 for any suitable purpose. For example, the post-processor module 216 can be used to convert acoustic data into text or digits for use with other aspects of the ASR system 210 or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212.

Method—

Figure 3:
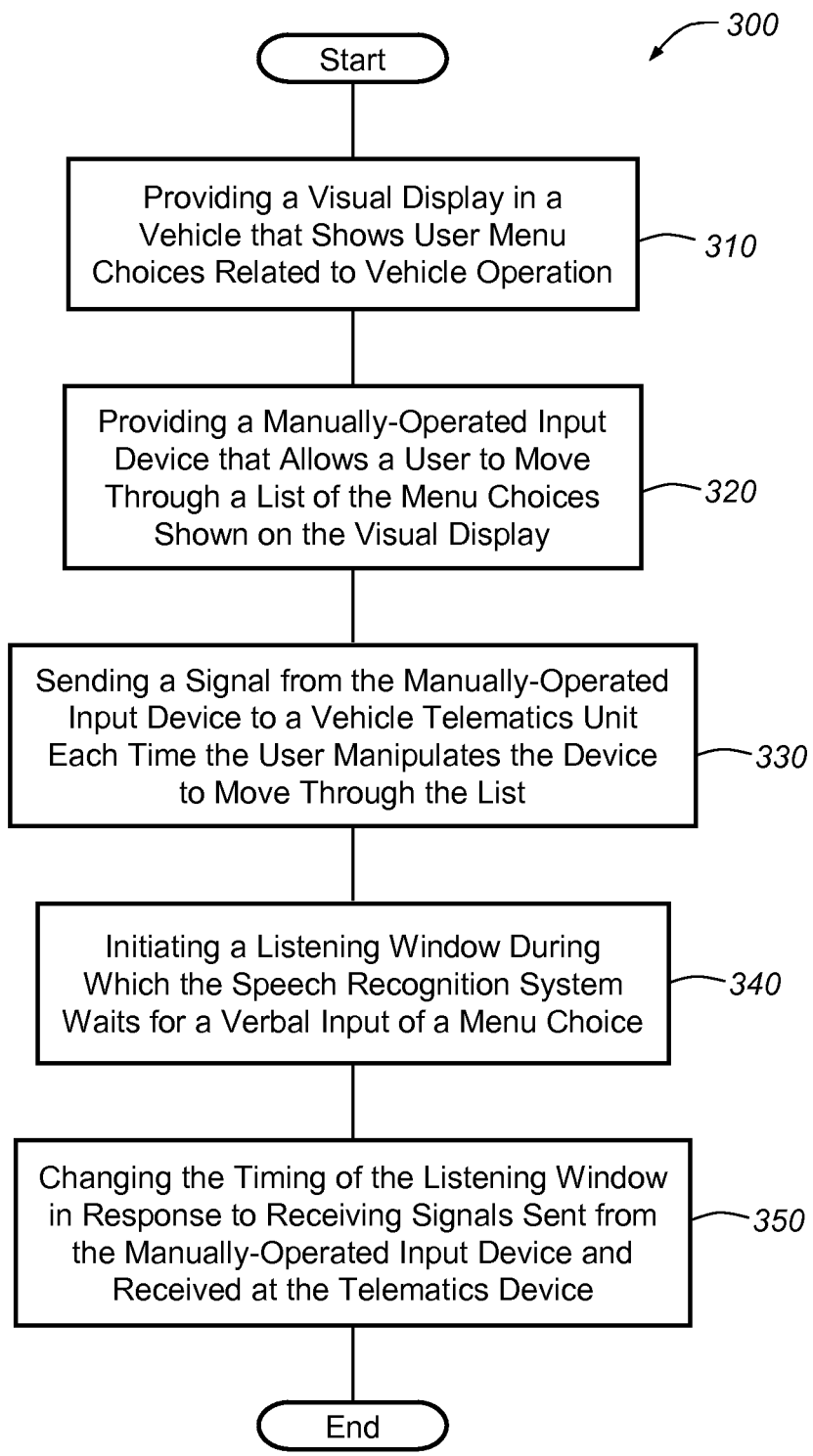
FIG. 3 is a flow chart depicting an exemplary embodiment of a method for operating a speech recognition system.

Turning now to FIG. 3, there is shown a method 300 that can be used to operate the ASR system 210 of FIG. 2.

The method 300 begins at step 310 where visual display 38 is used to present user menu choices related to vehicle operation. The visual display 38, introduced above, can be an LCD screen of suitable size mounted in the vehicle 12 and linked to other types of vehicle electronics 28. For instance, the visual display 38 can show the user a list of menu choices such as audio system settings, climate control settings, and communications preferences. The menu choices can be obtained from memory 54 within the telematics unit 30, from the call center 30, or any other suitable repository of data. The menu choices can also be output verbally via ASR system 210. The menu choices can be arranged in a scrolling or layered format so that only a fraction of the menu items are displayed at one time. In one example, a main menu can offer the user ten choices, the selection of any one of which can provide the user with additional choices, resulting in a hierarchal menu structure that provides dozens of choices. As a second example, of fifteen total choices, the display 38 can provide a scrolling window that only displays five at a time. The amount of choices available to the driver can be large and depends on the amount of options suitable for a particular system.

At step 320, a manually-operated input device is provided that allows a user to move through a list of the menu choices shown on the visual display 38. The input device can take a variety of forms. For example, in one embodiment, the input device comprises the rotary knob 39 that allows the user to rotate the knob 39 and scroll through or control the menu choices or selections shown on the visual display 38. Alternatively, the user can rotate the rotary knob 39 and the audio system 36 can recite the menu options as this occurs. If the user desires to select a particular menu option, the user could depress the knob 39, sending a signal indicating that the user has selected an option. But the manually-operated input device can take other forms as well. For instance, the input device can use a toggle switch and push buttons 34 to scroll through and select the menu items, respectively. Pushing a toggle switch one way or another can move a cursor up or down through a menu. When the user wants to make a selection, he can push the push button 34 when a cursor has highlighted a particular menu option. As another alternative, the input device can comprise a touch screen used on visual display 38. Also, the manually-operated device can be mounted in the vehicle 12 where it can be linked to the vehicle bus 44 or the device can be hardwired to the telematics unit 30 or linked to the vehicle 12 via a short-range wireless protocol, such as Bluetooth.

At step 330, a signal is sent from the manually-operated input device to a vehicle telematics unit 30 each time the user manipulates the device to move through the list. Manipulating the device can include rotating the rotary knob 39, depressing the rotary knob 39, pushing a toggle switch, pressing the button 34, or any other input from the user. Each time a user moves through a menu choice, the manually-operated input device can send a signal indicating that the user is scrolling through menu choices. Receiving the signal can be used by the system as an indication that the user is manipulating the device in conjunction with menu selections on the visual display 38. Since menus can contain variable amounts of choices, counting the signal sent each time a user scrolls through a menu choice can signify a relative frequency with which the user scrolls through menu choices and the number of menu choices the user views. It is possible to measure the signals in a variety of locations. The signals could be sent from the manually-operated input device to the telematics unit 30. Alternatively, the signals can be processed at the visual display 38 and data representing the frequency with which the user scrolls through the menu choices and/or number of signals generated can be sent to the telematics unit 30. Alternatively, there are other ways to measure the number of menu choices the user scrolls through. For example, a signal could be sent each time the user highlights a menu choice on the visual display 38. In this case, if a cursor highlighted the first selection and the user scrolled through the selections twice, twelve signals would be sent. Or in yet another example, a signal can be sent when the first menu selection is highlighted.

At step 340, a listening window is initiated, during which the speech recognition system 210 waits for verbal input of one of the menu choices. After the ASR system 210 asks a user a question, the system 210 can initiate a listening window during which the system 210 listens for a user response. The user can then provide verbal input answering the ASR system query. The verbal input can comprise user speech of a menu choice shown on the display 38 or user speech based on a menu choice. In one example, the ASR system 210 can ask the user a question and initiate a listening window. The ASR system 210 then waits for a verbal input response during this window. During the listening window, the user can use the manually-operated input device to move through menu choices displayed on the visual display 38. When the user locates the desired menu choice, if the manually-operated input device isn't used to select the choice, the user can verbalize the desired menu choice.

At step 350, the timing of the listening window is changed in response to signals sent from the manually-operated input device and received at the telematics unit 30. To prevent hearing an error message from the ASR system 210 indicating that the listening window has passed or expired, it is helpful to adjust the operation of the system 210 so as to change the timing of the listening window based on the signals received from the input device or the size of the list of menu choices provided in step 310. As one example, the timing can be changed in response to receiving a predetermined number of signals from the input device. A predetermined amount of signals can be a number of signals that indicate that the user is still moving through the menu choices and has not been provided enough time by the listening window to respond to the speech recognition system's question. For instance, the telematics unit 30 can store data in memory 54 that specifies a number of signals above which the timing of the listening window can be changed. Once the telematics unit 30 receives a greater amount of signals, the unit 30 can alert the system 210 that the user needs more time. The system 210, in response, can change the timing of the listening window. Alternatively, the telematics unit 30 can take a sample of the amount of signals received over a predetermined period and calculate the rate at which the user is moving through the menu choices. If the rate is greater than a predetermined rate, the timing of the listening window can be changed. Also, if during a listening window the telematics unit 30 is still receiving signals at a time when the listening period expires, the unit 30 can indicate to the ASR system 210 that the user has not had enough time to adequately read and understand all of the menu options. In yet another example, the timing of the listening window can be changed based on a predetermined elapsed time during which no input has been received from the manually-operated input device. In this example, the ASR system 210 can determine that it received no signals or other input during a predetermined amount of time and based on that determination realize that the user is no longer scrolling through the menu choices.

Once it is determined that the user needs more time to view the menu choices, changing the listening window can be accomplished in a variety of ways. For instance, the listening window can be shifted relative to its original position. The duration of the listening window can remain the same, but the starting time and ending time of the listening window can be delayed when a predetermined number of signals have been sent from the manually-operated input device and received at the telematics unit 30. In another example, the duration of the listening window can be extended. In this case, the starting point of the listening window remains the same, while the ending point is delayed. This can be done by monitoring for the signals and extending the listening period until an elapsed amount of time after the signals stop (i.e. the user has stopped using the input device to move through the list of choices). In yet another example, the listening window can be restarted after the expiration of a first listening window when a predetermined number of signals have been sent or received. Each example of changing the listening period can prevent the speech recognition system from playing a "no speech heard" timeout prompt if the user does not say a command or choose a menu option via the manually-operated input device.

Figure 4:
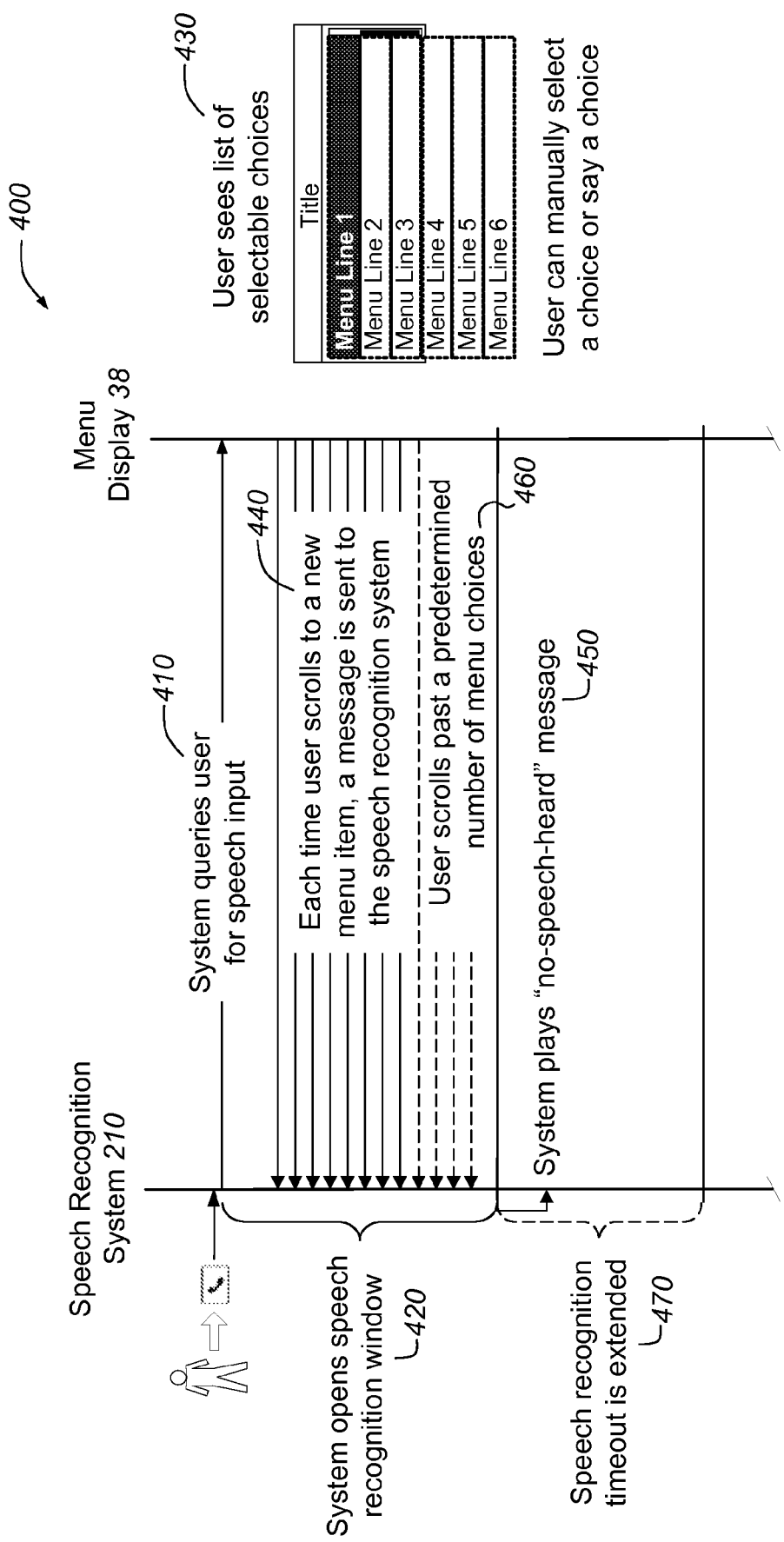
FIG. 4 is another exemplary embodiment of a method for operating a speech recognition system.

Turning now to FIG. 4, there is shown an exemplary, specific method 400 that can be used to operate the ASR system 210 of FIG. 2. The method 400 begins at step 410 when the system 210 queries the user for speech input. The system 210 opens a speech recognition window of a specified time period for a user response at step 420. Then, at step 430, the user is presented with a list of choices on the display 38. At step 440, each time the user scrolls to a new menu item, a message is sent to the system 210 (e.g. if user scrolls down to the third menu item, three messages are sent to ASR 210). If the user does not say a command or select a menu choice before the end of the time window, the system 210 plays a "no speech heard" timeout prompt at step 450. However, if before the end of the time window, the user scrolls past a predetermined number of menu choices (460), the speech recognition system listening window is extended or restarted, as indicated in broken lines and at step 470. When the listening window is extended or restarted, the user does not hear the timeout prompt.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of operating a speech recognition system, comprising:
    (a) providing a list of menu choices that can be inputted verbally by a user via a speech recognition system;
    (b) displaying menu choices from the list on a visual display; and
    (c) starting a listening period during which the speech recognition system listens for verbal input of one of the menu choices, wherein the method further comprises selecting the timing of the listening period based on data related to the size of the list.

2. The method of claim 1, wherein the step of selecting the timing further comprises lengthening the duration of the listening period in response to detecting that a user is interacting with the display of menu choices on the visual display.

3. The method of claim 1, wherein the step of selecting the timing further comprises delaying the start of the listening period in response to detecting that a user is interacting with the display of menu choices on the visual display.

4. The method of claim 1, wherein only some of the menu choices in the list are displayed on the visual display at any one time, and wherein the method further comprises using a manually-operated input device to move through the list of menu choices by changing which menu choices are displayed in response to manipulation of the input device.

5. The method of claim 4, further comprising sending signals each time a user manipulates the manually-operated input device.

6. The method of claim 5, further comprising determining the starting point of the listening period by counting the number of signals sent from the physical input device.

7. The method of claim 4, wherein the input device further comprises a rotary knob that allows the user to scroll through and select menu choices.

\* \* \* \* \*